United States Patent
Jones et al.

(10) Patent No.: US 9,353,879 B2
(45) Date of Patent: May 31, 2016

(54) BATTERY WATERING VALVE ASSEMBLY WITH FLASH ARRESTER

(75) Inventors: William E. M. Jones, Freeport (BS); Trevor Alden, Huntingdon Valley, PA (US)

(73) Assignee: PHILADELPHIA SCIENTIFIC LLC, Montgomeryville, PA (US)

( * ) Notice: Subject to any disclaimer, the term of this patent is extended or adjusted under 35 U.S.C. 154(b) by 1074 days.

(21) Appl. No.: 11/039,584

(22) Filed: Jan. 19, 2005

(65) Prior Publication Data
US 2005/0221166 A1 Oct. 6, 2005

Related U.S. Application Data

(60) Provisional application No. 60/537,691, filed on Jan. 20, 2004.

(51) Int. Cl.
*F17D 1/00* (2006.01)
*F16K 24/04* (2006.01)
(Continued)

(52) U.S. Cl.
CPC ............... *F16K 24/048* (2013.01); *F16K 31/26* (2013.01); *F16K 31/265* (2013.01); *H01M 2/127* (2013.01);
(Continued)

(58) Field of Classification Search
CPC ..... F16K 24/048; F16K 31/26; F16K 31/265; H01M 2/1247; H01M 2/36; H01M 2/362; H01M 2/368; H01M 10/4214; H01M 2/127; Y10T 137/7358; Y10T 137/4757; Y10T 137/7475
USPC .......... 137/260, 445, 409; 429/63, 64, 73, 74, 429/76–80, 82, 86; 141/198; 48/192; 431/346

See application file for complete search history.

(56) References Cited

U.S. PATENT DOCUMENTS 802,380 A * 10/1905 Emerson et al. ................. 48/192
1,044,651 A * 11/1912 Harris ........................... 431/346
(Continued)

FOREIGN PATENT DOCUMENTS

| DE | 31 27 619 | 1/1983 | ............ H01M 2/36 |
| DE | 34 41 006 | 5/1986 | ............ H01M 2/36 |

(Continued)

OTHER PUBLICATIONS

An Official Communication from the European Patent Office dated Nov. 2, 2010, for a related international application, Application No. EP 05000996.8-2422, which includes a letter dated Oct. 26, 2010 from the firm FR Kelly.

(Continued)

*Primary Examiner* — Craig J Price
(74) *Attorney, Agent, or Firm* — Gary A. Hecht; Fox Rothschild LLP (57) ABSTRACT

A float actuated valve assembly for battery electrolyte replenishment is disclosed. A housing engages an opening in a battery cell. An inlet in the housing is connectable to a water source. A valve in the housing controls the water flow to the cell. The valve is connected by a link to a four bar mechanism that is attached to a float. The float is buoyantly supported and rises and falls in response to the electrolyte level within the cell opening and closing the valve to admit or halt the flow of water to the cell. A baffle prevents fouling of the mechanism by splashing electrolyte. A flash arrester is positioned between the valve and the inlet to quench hydrogen-oxygen explosions between cells. The float is adjustable for different sized cells. A side viewable electrolyte level indicator is provided in the housing. Flash arresters for venting gas are also mounted.

20 Claims, 9 Drawing Sheets

(51) Int. Cl.
  *F16K 31/26*   (2006.01)
  *H01M 2/12*   (2006.01)
  *H01M 2/36*   (2006.01)
  *H01M 10/42*  (2006.01)

(52) U.S. Cl.
  CPC ............. *H01M 2/1247* (2013.01); *H01M 2/36* (2013.01); *H01M 2/362* (2013.01); *H01M 2/368* (2013.01); *H01M 10/4214* (2013.01); *Y10T 137/7358* (2015.04)

(56) References Cited

U.S. PATENT DOCUMENTS

| | | | | |
|---|---|---|---|---|
| 1,403,041 | A * | 1/1922 | Lawson | 137/260 |
| 1,407,610 | A * | 2/1922 | Westlund | 48/192 |
| 1,469,963 | A | 10/1923 | Sartakoff | |
| 1,471,362 | A * | 10/1923 | Sartakoff | 137/260 |
| 1,681,698 | A | 8/1928 | Brooks | |
| 1,942,908 | A * | 1/1934 | Swain et al. | 137/260 |
| 2,033,189 | A | 3/1936 | Eddy | 137/111 |
| 2,482,457 | A | 9/1949 | Boedecker | 48/192 |
| 2,582,577 | A * | 1/1952 | Zink et al. | 431/346 |
| 2,810,631 | A * | 10/1957 | Kanenbley | 48/192 |
| 3,243,272 | A * | 3/1966 | Schmitz | 48/192 |
| 3,287,094 | A * | 11/1966 | Brownell | 48/192 |
| 3,356,256 | A | 12/1967 | Szego | |
| 3,550,651 | A * | 12/1970 | Clayton et al. | 141/198 |
| 3,650,431 | A | 3/1972 | Stewart | |
| 3,944,437 | A * | 3/1976 | Auerbach | 429/82 |
| 4,002,495 | A * | 1/1977 | Hakarine | 429/87 |
| 4,013,190 | A | 3/1977 | Wiggins et al. | |
| 4,063,667 | A * | 12/1977 | Flider | 222/470 |
| 4,081,656 | A | 3/1978 | Brown | 219/137.31 |
| 4,361,746 | A | 11/1982 | Johnson et al. | 219/70 |
| 4,424,263 | A | 1/1984 | Howell et al. | |
| 4,444,853 | A * | 4/1984 | Halsall et al. | 429/54 |
| 4,512,378 | A | 4/1985 | Oschmann | 141/198 |
| 4,557,984 | A | 12/1985 | Offidani | 429/67 |
| 4,585,409 | A * | 4/1986 | Pryor | 431/346 |
| 4,696,874 | A | 9/1987 | Tadiello | 429/64 |
| 4,751,156 | A * | 6/1988 | Olimpio | 429/64 |
| 4,916,034 | A * | 4/1990 | Hulsebus et al. | 429/86 |
| 5,000,336 | A | 3/1991 | Gass | |
| 5,108,853 | A * | 4/1992 | Feres | 429/86 |
| 5,132,175 | A * | 7/1992 | Mrotek et al. | 429/86 |
| 5,246,130 | A | 9/1993 | Mondt et al. | |
| 5,309,937 | A | 5/1994 | Rover | 137/260 |
| 5,392,825 | A | 2/1995 | Mims et al. | 137/614.2 |
| 5,407,348 | A | 4/1995 | Mims et al. | 431/346 |
| 5,422,199 | A * | 6/1995 | Adams et al. | 429/88 |
| 5,803,138 | A | 9/1998 | Oschmann et al. | 141/198 |
| 5,832,946 | A * | 11/1998 | Campau | 137/15.08 |
| 5,856,037 | A * | 1/1999 | Casale et al. | 429/82 |
| 5,862,830 | A | 1/1999 | Landau | 137/260 |
| 6,105,676 | A | 8/2000 | Alhamad | |
| 6,227,229 | B1 * | 5/2001 | Campau | 137/260 |
| 6,273,711 | B1 * | 8/2001 | Duva | 431/346 |
| 6,338,319 | B1 * | 1/2002 | Vago | 431/346 |
| 6,427,732 | B1 * | 8/2002 | Fitter | 141/95 |
| 6,432,573 | B1 | 8/2002 | Oschmann | 429/89 |
| 6,622,744 | B2 | 9/2003 | Crook et al. | |
| 6,718,996 | B2 * | 4/2004 | Crook et al. | 137/260 |
| 2006/0177729 | A1 | 8/2006 | Campau | |
| 2009/0286142 | A9 * | 11/2009 | Campau | 429/86 |

FOREIGN PATENT DOCUMENTS

| | | | |
|---|---|---|---|
| DE | 295 19 146 | 4/1996 | ............. H01M 2/36 |
| DE | 195 11 803 | 10/1996 | ............. H01M 2/36 |
| DE | 198 38 486 | 3/2000 | ............. H01M 4/14 |
| EP | 0 083 358 | 10/1985 | ............. H01M 2/36 |
| EP | 0 201 535 | 5/1989 | ............. H01M 2/36 |
| EP | 0501709 A1 | 9/1992 | |
| EP | 0 763 262 | 6/1998 | ............. H01M 2/36 |
| EP | 0 996 986 | 7/2002 | ............. H01M 2/12 |
| EP | 1447865 A2 | 8/2004 | |
| GB | 204962 | 10/1923 | |
| GB | 333291 | 8/1930 | |
| GB | 919209 | 2/1963 | |
| GB | 1207531 | 10/1970 | |
| GB | 2016798 A | 9/1979 | |
| WO | WO83/00260 | 1/1983 | ............. H01M 2/36 |
| WO | WO86/03061 | 5/1986 | ............. H01M 2/36 |
| WO | WO96/30956 | 10/1996 | ............. H01M 2/36 |
| WO | WO99/56330 | 11/1999 | ............. H01M 2/12 |

OTHER PUBLICATIONS

Patent Abstracts of Japan; Appln. No. 62217181, dated Aug. 31, 1987 (Kazuya), published Jan. 5, 1989 as publication No. 64000644, entitled Electrolyte Pouring Device for Storage Battery.

* cited by examiner

FIG.6

BATTERY WATERING VALVE ASSEMBLY WITH FLASH ARRESTER

FIELD OF THE INVENTION

The invention concerns float actuated valves for controlling the flow of water to battery cells for replenishment of aqueous electrolyte.

BACKGROUND OF THE INVENTION

Float actuated valves are used to control the flow of water into a cell of a battery for replenishing the aqueous electrolyte that is lost during battery charging. Such batteries typically comprise a casing containing a number of individual cells each holding an electrolyte solution in which plates are immersed. Examples of batteries having an aqueous electrolyte include nickel-cadmium batteries or lead-acid type batteries. Oxygen and hydrogen gases are produced during charging as a result of electrolysis of the water. The gases bubble up through the electrolyte, cause splashing of the electrolyte at its free surface within the cells, and accumulate in a gas space above the plates and the electrolyte. The electrolysis causes a loss of water from the electrolyte solution, and as a result, such batteries require periodic replenishment of the lost water.

Float actuated valves are advantageous because they provide a valve that opens and closes automatically in response to the level of electrolyte within a cell. When the electrolyte level is low, the valve opens to allow water to flow into the cell. The valve closes to halt the flow of water once the desired level of electrolyte is reached. This is accomplished by using a float positioned within the cell to open and close the valve. The float is buoyantly supported by the electrolyte and connected to the valve via an actuating mechanism. When the electrolyte level is low, the float moves downwardly away from the valve and its weight applies a force that acts through the actuating mechanism to open the valve. As water flows into the cell through the open valve, the electrolyte level rises and the float is buoyed upwardly and applies an opposite force to the valve through the mechanism which closes the valve once a desired electrolyte level is reached.

One weakness of float actuated valves currently in use lies in the mechanism that links the float to the valve. This mechanism typically has several moving parts and is prone to stick or jam over time because it becomes fouled with a sticky tar-like residue formed by sulfuric acid reacting with mineral oil which leaches out of the polyethylene material forming the walls of each cell. The residue is deposited on the mechanism when the hydrogen and oxygen bubbles burst at the free surface of the electrolyte. The bubbles splash the residue, which floats on the free surface, onto the mechanism. The residue fouls the parts, which are typically close toleranced sliding components, and prevents them from moving freely relatively to one another, eventually preventing all movement of the float and locking the valve in a closed or an open position. Actual field experience in Europe and the U.S. indicates that present float valves tend to fail in less than 18 months in high temperature or heavy duty service.

Another weakness of float valves is their lack of resistance to progressive hydrogen-oxygen explosions traveling between cells. Typically, the cells are connected in series to one another through the conduit that supplies replenishing water. Most of the valve designs currently in use have a water trap in the valve that is intended to prevent a flash path from developing through the conduit between the cells. Unfortunately, the water does not always remain within the trap. It can evaporate, drain out if the battery is tilted or be forced out by gas pressure that develops within each cell during charging.

Yet another problem associated with current float actuated valves is their lack of a flash arrester for hydrogen gas that vents from the cell to the ambient. Such flash arresters would be effective at preventing a hydrogen-oxygen explosion, but are often not used because they tend to restrict gas flow from the cells which causes a back pressure to develop within the cells. The gases that build up in the cells often find an escape path through the water traps and conduit described above that connect the cells for water replenishment, thus, forming a perfect flash path for a progressive hydrogen-oxygen explosion throughout the cells of the battery.

There is clearly a need for an improved float actuated valve that addresses the aforementioned weaknesses of float valves currently in use.

SUMMARY OF THE INVENTION

The invention concerns a valve assembly mountable on a battery cell and connectable to a water source for controlling the flow of water from the source to the cell for electrolyte replenishment. The valve assembly comprises a housing sealingly engageable with an opening in the cell. An inlet is positioned in the housing, the inlet being connectable to the water source. A valve is mounted within the housing in fluid communication with the inlet. The valve has a member movable to open it and admit water from the source into the cell, the member also being movable to close the valve and halt the flow of water to the cell. A float is positionable within the cell. The float is buoyantly supportable by the electrolyte and movable relatively to the valve in response to changes in the level of the electrolyte within the cell. First and second elongated arms are arranged in substantially parallel, spaced apart relation within the housing. One end of each arm is pivotally attached to the housing, the other end is pivotally attached to the float. The float pivots the arms upon movement relatively to the valve. A link member connects one of the arms to the movable valve member. The link member moves the valve member upon pivoting of the one arm to open the valve and admit water to the cell when the float moves in a direction away from the valve, indicative of a low electrolyte level. The link member moves the valve member to close the valve and halt water flow to the cell when the float moves toward the valve to a position indicative of an adequate electrolyte level within the cell.

Preferably, the float valve according to the invention also comprises a baffle plate mounted within the housing and positioned between the arms and the float. The baffle plate protects the arms from the electrolyte splashing within the cell during charging of the cell.

A flash arrester positioned within the housing between the inlet and the valve may also be included as part of the valve. The flash arrester has a plurality of passageways therethrough adapted to allow water to flow from the inlet to the valve, but the passageways are sized so as to quench a hydrogen-oxygen explosion.

Preferably, a vent duct is positioned within the housing for providing fluid communication between the cell and the ambient. The vent duct vents hydrogen and oxygen gases from the cell and has a hinged cover with a slot for venting gases to the ambient.

A flash arrester may be in fluid communication with the vent duct. The flash arrester comprises a porous medium positioned within a chamber located between the vent duct and an outlet. The medium is in spaced relation to a cover enclosing the chamber. The hydrogen and oxygen gases pass from the cell through the medium into the space between the medium and the cover before exiting to the ambient through the outlet. The pores of the medium are sized to quench hydrogen-oxygen combustion and stop it from flashing into and igniting the cell. The space between the medium and the cover allows a controlled mini-explosion to extinguish any flame which could burn on the surface of the medium, melt it and then ignite the cell.

The invention also includes a battery using one or more valve assemblies and flash arresters as described above.

DETAILED DESCRIPTION OF PREFERRED EMBODIMENTS

Figure 1:
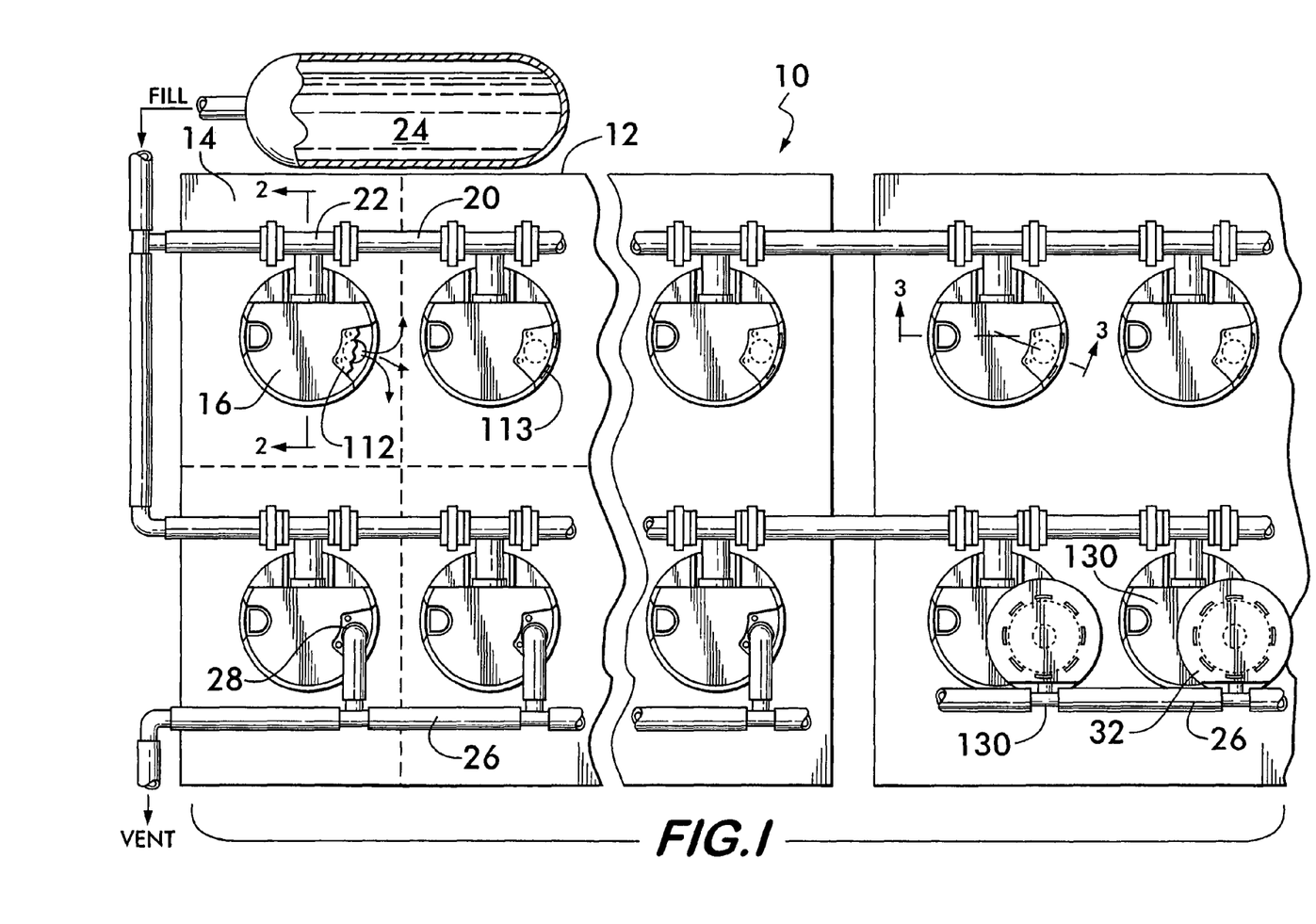
FIG. 1 is a plan view of a battery having float valve assemblies according to the invention.
Figure 2:
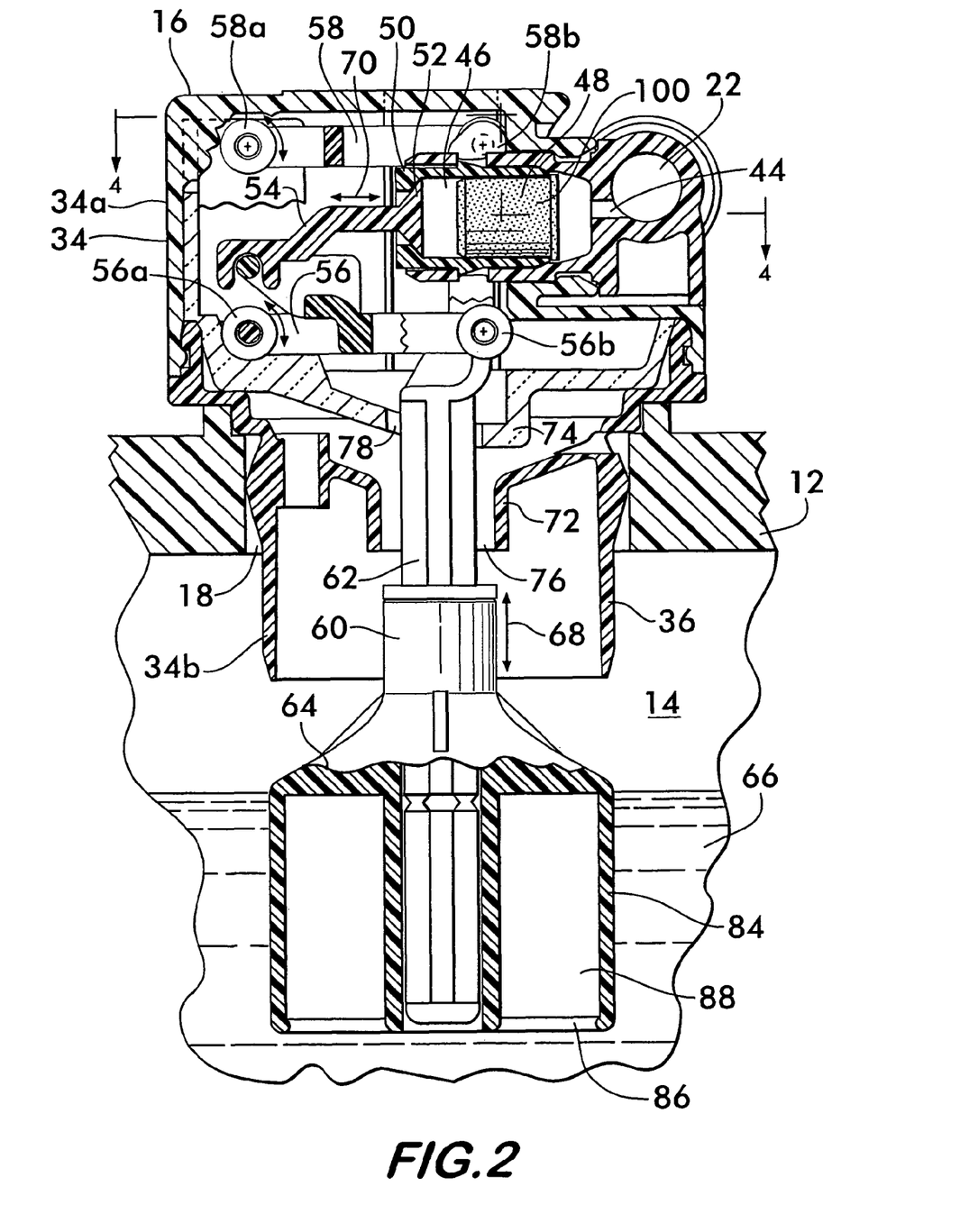
FIGS. 2, 2A and 2B are longitudinal sectional views of a float valve assembly taken at line 2-2 of FIG. 1.

FIG. 1 shows an aqueous electrolyte battery 10 comprising a casing 12 divided into a plurality of cells 14, each cell having its own float valve assembly 16 sealingly engaged with a vent opening 18 in the cell (see also FIG. 2). Float valves 16 are connected in series to one another by a fluid conduit 20 that engages tee fittings 22 on each float valve. The conduit 20 is connectable to a water source 24 which provides water to replenish electrolyte lost from the cells during charging. During water replenishment, each float valve 16 controls the flow of water to its associated cell as described below. The float valves may also be connected to a gas conduit 26 in fluid communication with a gas discharge outlet 28 on each float valve. The gas discharge outlet allows oxygen and hydrogen gas, generated by electrolysis during charging, to vent from the cells. The gas conduit 26 conducts the gas away to be discharged to the ambient remotely from the cells 14. A flash arrester 32, described in detail below, is preferably mounted on the float valves 16 and may be connected to the gas conduit 26 using compatible fittings or may vent freely to the ambient.

Figure 6:
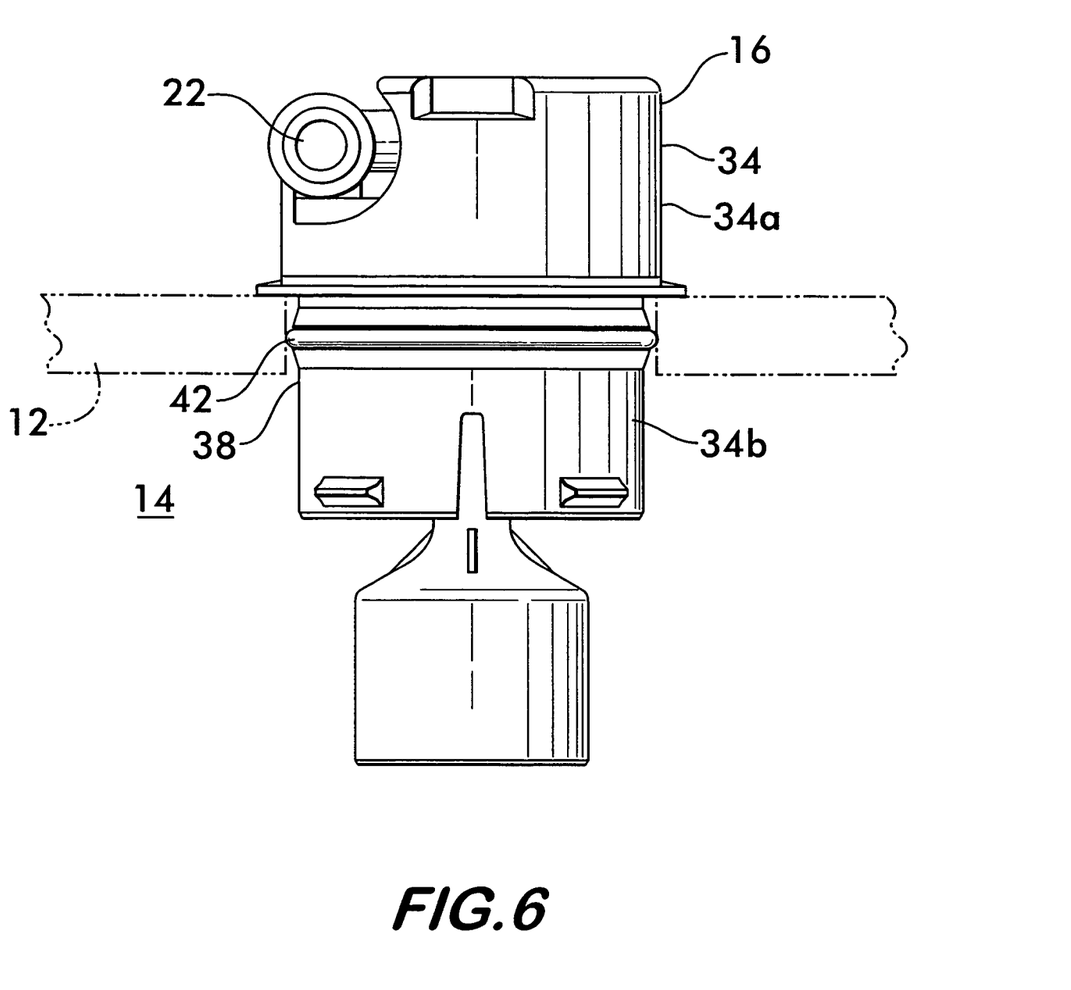
FIG. 6 is an elevational view of an alternate embodiment of a float valve assembly according to the invention.

FIG. 2 shows a sectional view of a float valve assembly 16 according to the invention. Float valve 16 comprises a housing 34 having an upper portion 34a that houses the valve assembly mechanism, and a lower portion, 34b, that sealingly engages vent opening 18 defined by casing 12 of cell 14. Lower housing portion 34b is adapted to be compatible with a specific type of vent opening, for example, the quarter-turn bayonet type mount 36 as shown in FIG. 2 and found on U.S. batteries, or, as shown in FIG. 6, the 35 mm push fit mount 38, compatible with the German Industry Standard (DIN) and found on European batteries. Float valves compatible with the German standard use an O-ring seal 42 between the valve assembly and the casing to effect a seal and allow the valve assembly to rotate.

In the float valve assembly compatible with the U.S. bayonet mount 36 (see FIG. 2), the lower housing portion 34b has an outwardly bulged section 40 that is flexible and resilient and that snaps under the lugs of the bayonet mount, but allows the valve assembly to rotate within the opening 18.

With reference again to FIGS. 2, and 2A, an internal water conduit 43 is provided through which the water 71 flows from an inlet 44 to an outlet 45. The water conduit 43 includes the inlet 44 which is in fluid communication with Tee fitting 22 in the housing upper portion 34a. Inlet 44 leads to a chamber 46 which houses a flash arrester 48, described below. A valve 50 is in fluid communication with chamber 46. Valve 50 comprises a member 52 that is movable between a closed position (shown in FIG. 2) and an open position (shown in FIG. 2A) to open and close valve 50 and control the flow of water therethrough. The water exits the conduit 43 through the outlet 45 into the housing portion 34b to flow into the battery cell. A link member 54 attaches movable member 52 to an arm 56. Arm 56 has a counterpart arm 58 and forms a four bar mechanism. Arms 56 and 58 are in substantially parallel, spaced apart relation and have respective first ends 56a and 58a that are pivotally attached to housing upper portion 34a. The second ends 56b and 58b are pivotally attached to a float 60. Float 60 comprises a rod 62 to which the arms 56 and 58 are pivotally attached, and a buoyant body 64 that is buoyantly supported by the electrolyte 66 in cell 14.

Figure 2A:
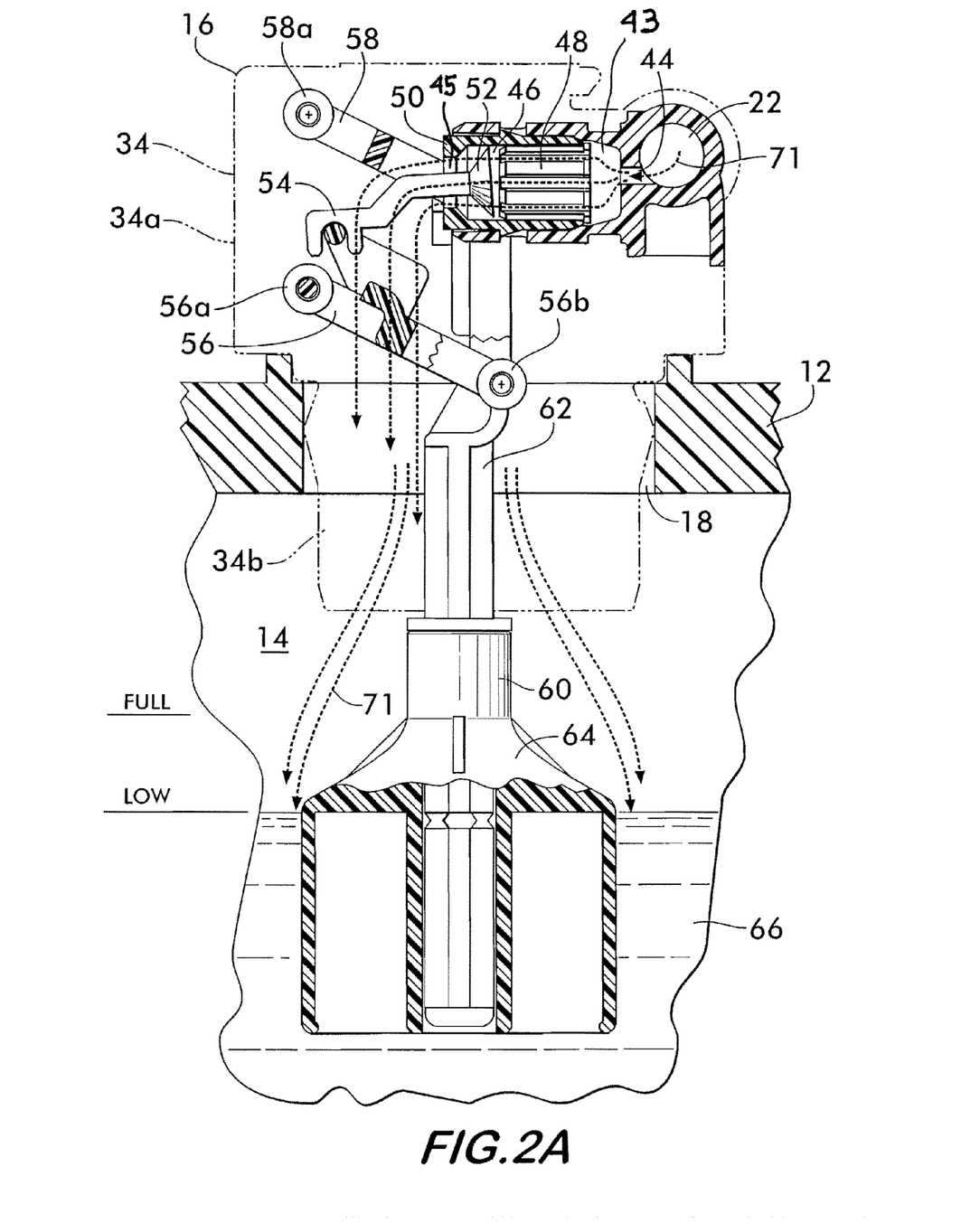

Float 60 moves up and down in the direction of arrow 68 in response to the electrolyte level within cell 14. The use of the four bar mechanism formed by arms 56 and 58 constrains the float to movement substantially in the vertical direction as shown. Upward and downward motion of the float 60 is translated into substantially horizontal motion of the movable member 52, as indicated by arrow 70, by the link member 54 that is pivotally connected to arm 56. It is recognized that link member 54 could be connected to either arm 56 or 58 and still effect opening and closing of the valve 50. Further, the motion of the movable member need not be horizontal, but could be oriented in other directions as required to open and close valve 50, which, in this example, is oriented for actuation in a horizontal direction.

Two baffle plates, 72 and 74, divide the upper housing portion 34a from the lower housing portion 34b. Rod 62 extends through respective openings 76 and 78 through the baffle plates. The baffle plates protect the four bar mechanism from fouling by electrolyte splash that occurs at the free surface when charging forms oxygen and hydrogen gas bubbles which rise through the electrolyte 66 and burst at the surface. Further protection against fouling of the mechanism is afforded by positioning it in the upper housing portion 34a as far away from the electrolyte as possible, and preferably above the cell casing 12.

Figure 2B:
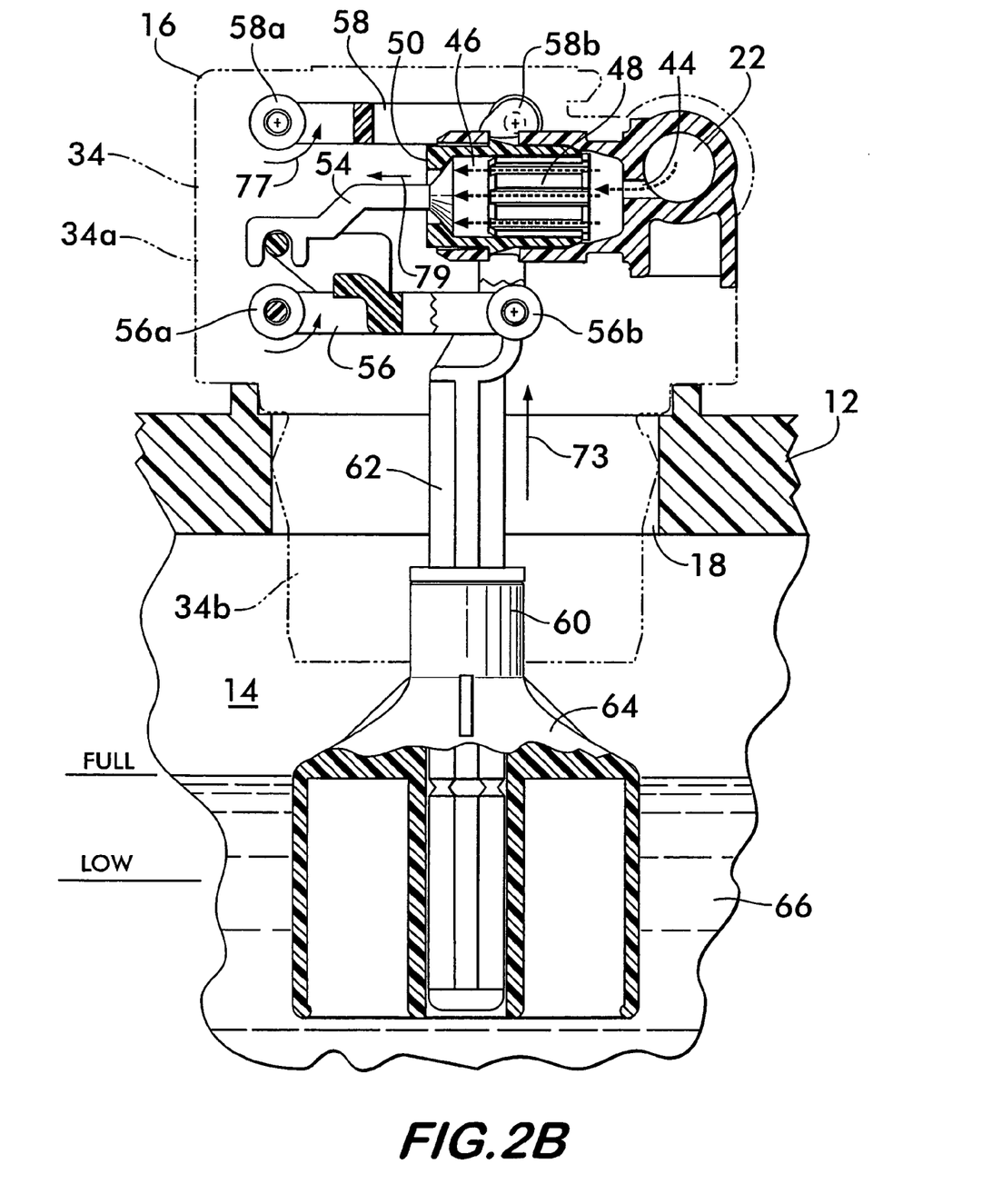
Figure 4:
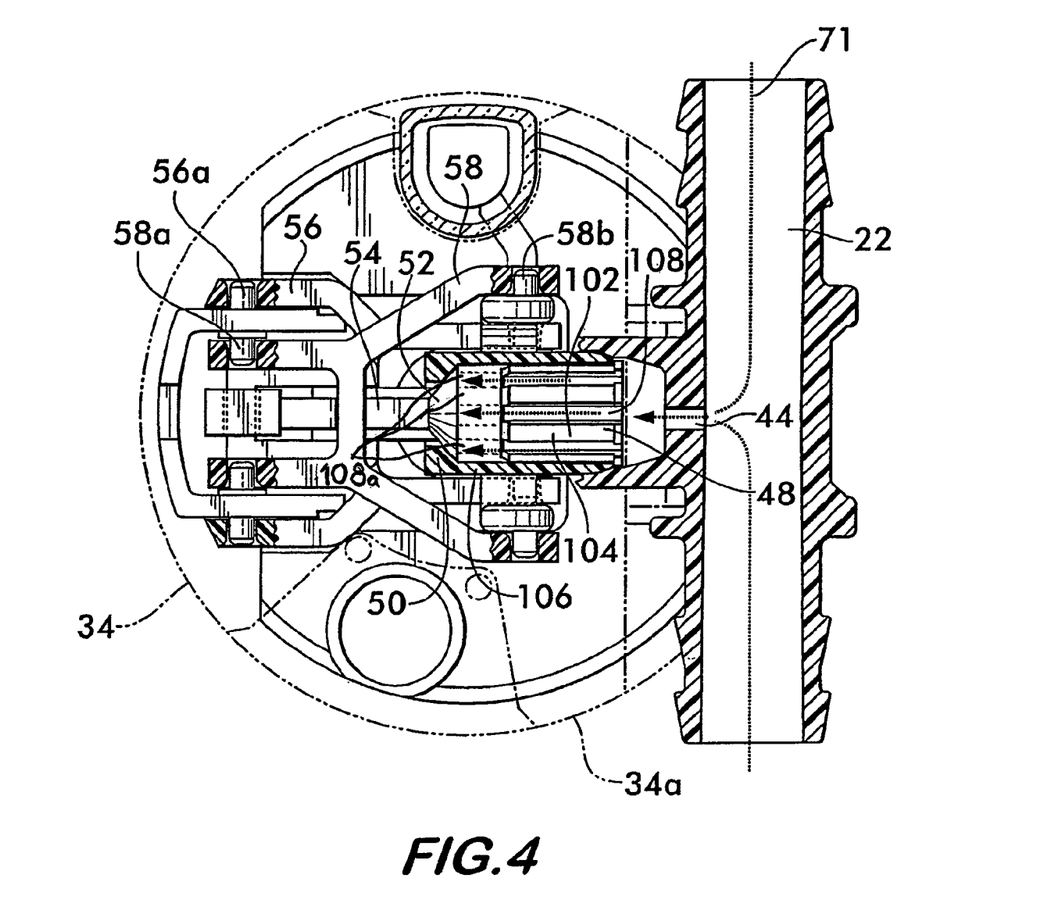
FIG. 4 is a cross-sectional view taken at line 4-4 of FIG. 2.

Replenishment of electrolyte is initially described with reference to FIGS. 1 and 4. Conduit 20 is attached to water source 24 and water is permitted to flow to Tee fittings 22 of battery 10. As shown in FIG. 4, water 71 enters chamber 46 through inlet 44 and passes through flash arrester 48 to valve 50. If, as shown in FIG. 2A, the electrolyte 66 is at a low level, then the weight of float 60 pivots arms 56 and 58 downwardly, forcing the link member 54 toward valve 50 and moving the movable valve member 52 into an open position. Water 71 flows through the valve 50, into the lower housing portion 34b and is discharged into cell 14. As the water flows into the cell, the electrolyte level rises until it reaches a desired level, shown in FIG. 2B. Buoyant force exerted by the electrolyte 66 on the buoyant body 64 causes the float 60 to rise in the direction of arrow 73, pivoting arms 56 and 58 upwardly as indicated by arrows 77. Motion of the arms is conveyed to the movable valve member 52 through link member 54, and the valve is closed as indicated by arrow 79, halting the flow of water 71.

Figure 3A:
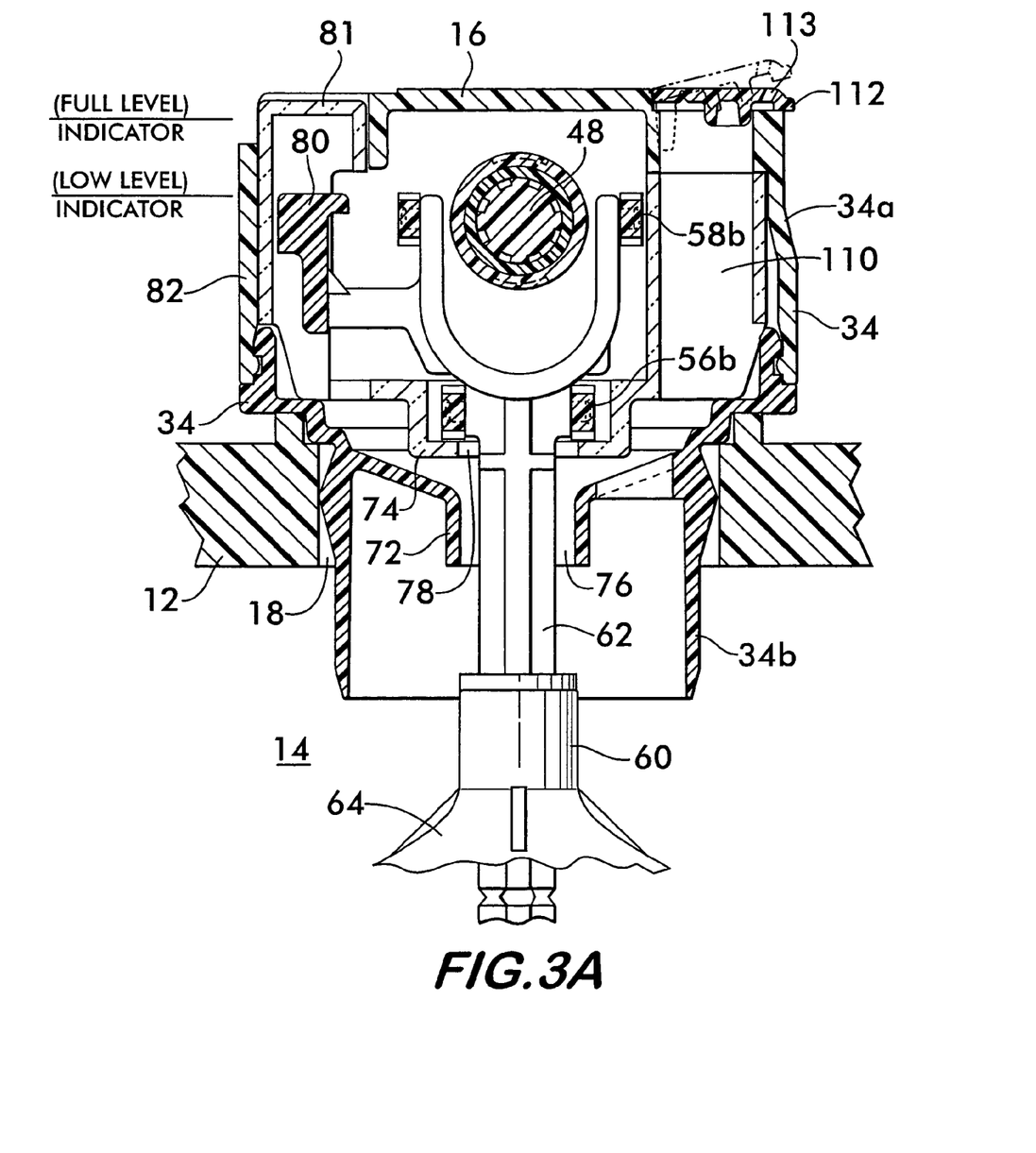
FIGS. 3A and 3B are longitudinal sectional views of a float valve assembly taken at line 3-3 of FIG. 1.
Figure 3B:
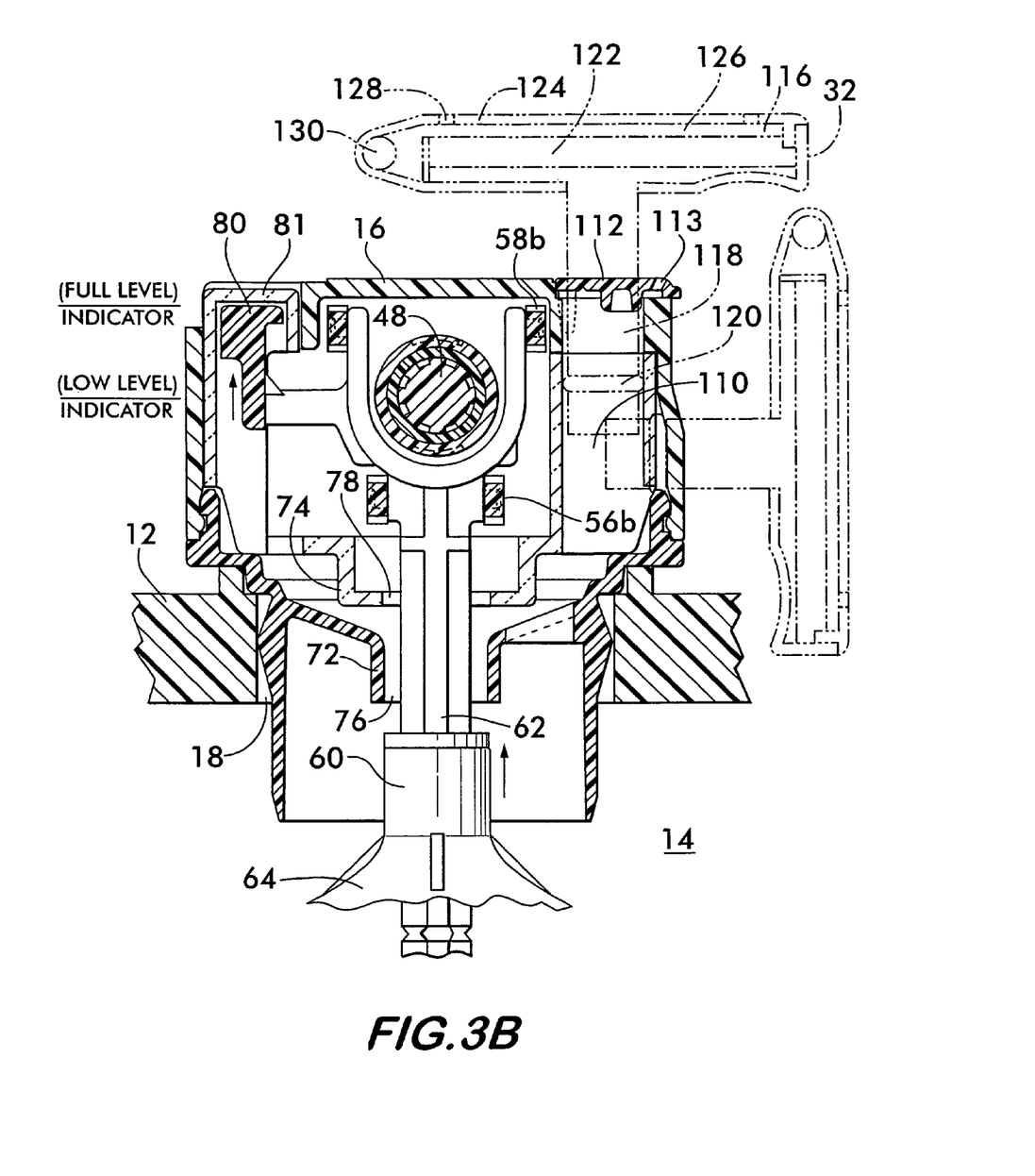

Visual confirmation that the electrolyte is at the desired level in a cell is provided by an indicator 80 shown in FIGS.

3A and 3B. Indicator 80 is positioned in upper housing portion 34a and preferably attached to the rod 62 of float 60. A window 81, formed of a transparent material through which the indicator may be viewed, is positioned in the sidewall 82 of the housing 34. It is advantageous to position the window so that the indicator 80 is visible from both the side and the top of the valve assembly. This configuration is convenient when the battery is positioned within a tunnel, as is the case for various forklift trucks, which affords a view of the battery only from the side. The indicator may be a bright fluorescent color so as to be more readily visible through window 81. Being mounted on the float, the indicator moves with it. In a preferred embodiment, when the electrolyte level is low, the indicator is not visible in window 81 as shown in FIG. 3A. However, when the electrolyte is at the desired level, the indicator is moved upwardly along with the float 60, and is visible through window 81 as shown in FIG. 3B.

Motion of the arms 56 and 58 to open and close valve 50 as well as to move the indicator 80 is effected by the buoyancy of buoyant body 64. In a preferred embodiment, shown in FIG. 2, the buoyant body comprises an inverted cup 84 with an open end 86 that interfaces with the electrolyte 66. Buoyancy is afforded by air trapped within the interior space 88 of cup 84 by the electrolyte. This configuration is preferred to a sealed hollow body, which has a tendency to leak, flood with electrolyte, and lose buoyancy, thereby holding the valve 50 in an open position regardless of electrolyte level. In an alternate embodiment, shown in FIG. 5A, the cup 84 may be filled with a buoyant material 90, such as a low density, closed cell, polyurethane foam.

Figures 5, 5A:
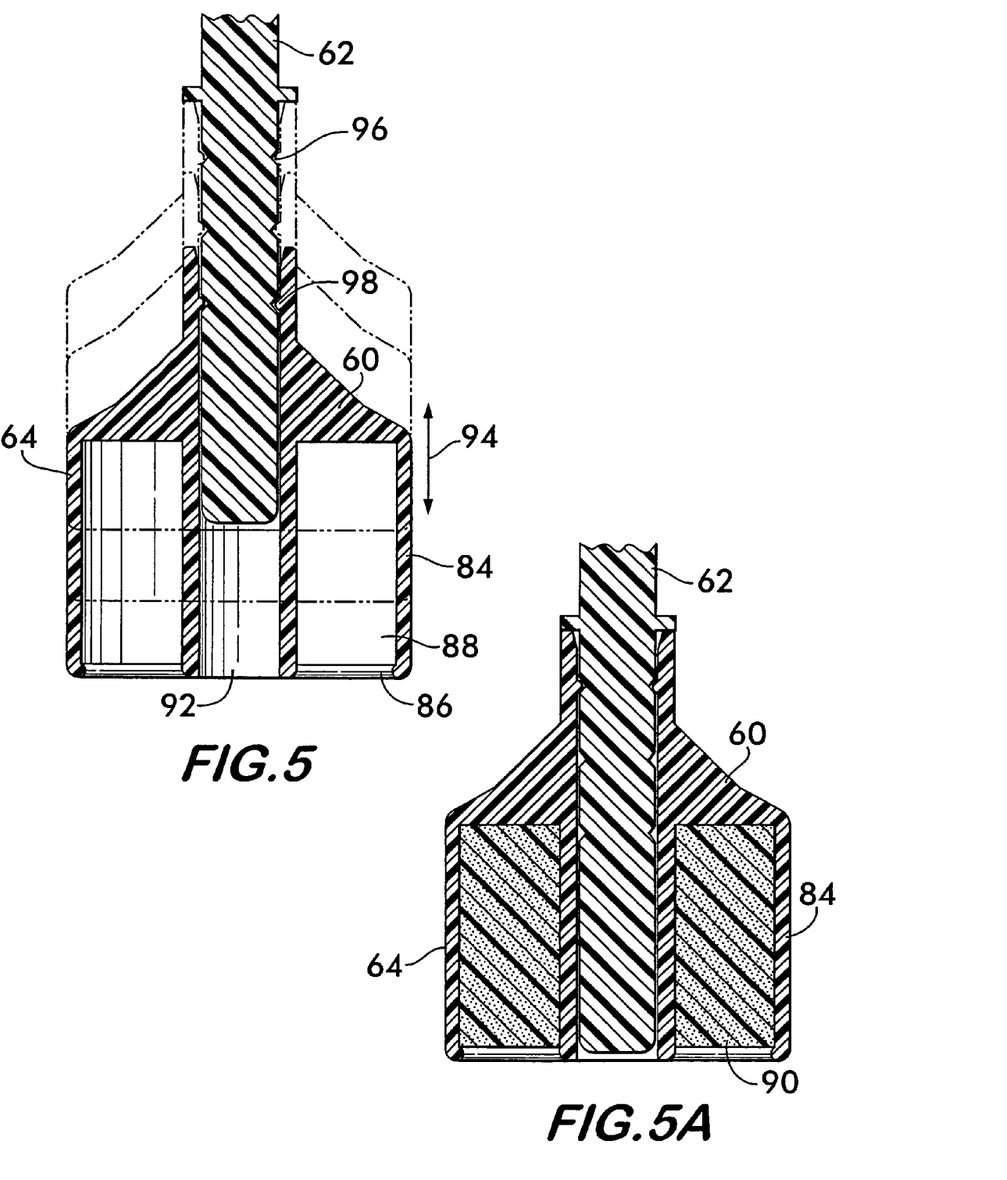
FIGS. 5 and 5A are longitudinal sectional views of a portion of the float valve assembly.

It is advantageous to make the buoyant body 64 adjustable on the rod 62 so that one valve assembly may be used with cells of various sizes. This is accomplished, as shown in FIG. 5, by forming a bore 92 through the buoyant body adapted to receive rod 62. The body 64 is slidable along the rod 62 as indicated by arrow 94. Preferably, a plurality of indentations 96 are spaced lengthwise along the rod. The indentations cooperate with a projection 98 positioned within the bore 92 to fix the body 64 in any one of a number of desired predetermined locations along rod 62 as indicated in phantom line. This allows the valve assembly to compensate for different sized cells having different electrolyte levels relative to the position of the valve assembly mounted in the vent opening of the casing. The rod 62 and the buoyant body 64 are preferably made of a flexible, resilient material, such as an acid resistant polymer, to permit easy manual adjustment.

The valve assembly 16 preferably incorporates two types of flash arresters. Flash arrester 48, shown in FIG. 2 and known as an "in line flash arrester", is positioned within chamber 46 and prevents the fluid conduit 22 from forming a flash path between cells that would otherwise support a progressive hydrogen-oxygen explosion. In the embodiment illustrated in FIG. 2, the flash arrester comprises a porous medium 100 within chamber 46. The medium 100 allows water to flow when the valve 50 is open, but the pores are sized so as to quench a hydrogen-oxygen explosion. Preferably, the medium comprises a sintered plastic, such as polypropylene. Sintered ceramics, such as aluminum oxide, are also feasible. Nominal pore size is preferably less than about 1/100 of an inch to quench the hydrogen-oxygen explosion. The quenching effect is based upon the same principle as used for methane gas in the Davey lamp. Use of the medium 100 "in line" with the water inlet 44 provides a safety barrier preventing the propagation of an explosion from cell to cell which cannot be circumvented as long as the medium is in place. Unlike valves that use a water trap, the in line arrester disclosed herein is not adversely affected by gas pressure build up within the cell 14 during charging.

In another embodiment, shown in FIG. 4, the in line arrester comprises a body 102 positioned within the chamber 46. The body has an outer surface 104 that interfaces with the inner surface of the chamber wall 106. A plurality of grooves 108 are formed lengthwise along outer surface 104 of body 102. The grooves cooperate with the chamber wall and form passageways between the inlet 44 and valve 50 allowing water 71 to flow. The grooves are sized so as to quench a hydrogen-oxygen explosion, and thus prevent the formation of a cell to cell flash path by fluid conduit 20. Grooves 108 are about 1/100 of an inch deep, which is sufficiently small to quench any hydrogen-oxygen explosion. Alternately, the grooves 108a may be positioned in the chamber wall 106 and the outer surface 104 of body 102 may be smooth. The grooves 108a in the chamber wall cooperate with the smooth outer surface of body 102 to form the flame quenching passageways between inlet 44 and valve 50.

Preferably, as shown in FIGS. 3A and 3b, a vent duct 110 is positioned within housing 34 and provides fluid communication between cell 14 and the ambient. Vent duct 110 may be closed with a hinged cover 112 having a slot 113 for venting gases to the ambient. The vent duct 110 may also be used in conjunction with a gas conduit 26 as shown in FIG. 1, or a flash arrester 32, as described below.

FIG. 3B illustrates, in phantom line, a flash arrester embodiment, 32. Arrester 32 is mountable either on top or on the side of the valve assembly 16 and comprises a chamber 116 in fluid communication with vent duct 110 through a tube 118 extending from the chamber. Tube 118 may have a seal, such as O-ring 120, that allows the tube to sealingly engage the vent duct 110 and thereby channel any gas from the cell 14 into the chamber. A porous medium 122 is positioned within the chamber 116. Gases are directed from tube 118 into the medium and diffuse therethrough. Pores in the medium are sized to quench a hydrogen-oxygen explosion and prevent a flash from entering cell 14. Chamber 116 has a cover 124 that is positioned in spaced relation to the medium 122. The space 126 between the medium and the cover is such that it will allow a small controlled explosion that extinguishes any continuous flame and prevent it from melting the flash arresting medium 122. Vent ports 128 in cover 124 form gas outlets allowing the gases to escape from chamber 116 to the ambient. Alternatively, the gas outlet may be provided by a fitting 130 in fluid communication with chamber 116. As shown in FIG. 1, fitting 130 is connected to the conduit 26 which allows the hydrogen and oxygen gases to be vented to the ambient remotely from the battery.

Float valve assemblies according to the invention provide distinct advantages over valves currently in use for battery watering in that the four bar mechanism used to actuate the valve in response to motion of the float is not subject to jamming or sticking due to electrolyte residue fouling because it does not have relatively sliding parts and is also protected by a splash baffle. The fluid conduit providing water to the cells cannot form a flash path for a hydrogen-oxygen explosion because there is an in line flash arrester that uses passageways having small dimensions to quench any such explosions. Additional flash arresters enhance safety during charging by preventing hydrogen-oxygen explosions when gases are vented from the cells. Further advantageous features include a side viewable electrolyte level indicator and an unsinkable float that is adjustable for accommodating different sized cells. The housing is adaptable for use with both U.S. and European batteries.

A further advantageous feature of the present invention is the use of the existing water supply tubing 20 and the valve assemblies 16 shown in FIG. 1 for evaporative air cooling of the battery cells. Since water filling is a very intermittent operation, seldom carried out more than once a week, the entire water tubing system and the valve assemblies are available for another use most of the time. It is well known that the heat of evaporation of water is 540 kcal/gram, so passing air through the water tubing 20 into the head space of a battery cell, and thence to atmosphere, increases the evaporation rate of water from the cell electrolyte and thereby cools the cell. The amount of cooling will depend on the amount of water evaporated which, in turn, will depend on the quantity of air flow and the dryness of the air among other factors.

The preferred approach involves forcing lightly compressed atmospheric air, preferably as dry as possible, through the water supply tubing and into each cell of the battery, thereafter venting the now wet air to atmosphere through the existing vent and thereby removing heat from the cell. This process has been shown by experiment to cool the cells appreciably, especially if the air flow is continuous. The compressed air is preferably produced by a pump or pumps mounted on the battery or on the vehicle so that the air flow may operate nearly continuously of necessary. But the pumps may also be mounted on or near the battery charger and used only during charging. A thermostat, timer or other controls, not shown, may control the air pump or pumps.

A further benefit of this feature is that, if operated during recharging of the cells, the air flow entering each cell from the water tubing prevents hydrogen gas from entering the water tubing, thereby completely preventing an ignition path in the tubing at all times the pumps are on, even if the cell is slightly pressurized by flash arresters in the vent. The air flow, which is largely non-explosive nitrogen, also dilutes the hydrogen concentration inside the cell head space. Both of these actions improve the safety of the battery to a useful degree.

What is claimed is:

1. A valve assembly mountable on a battery cell and connectable to a water source for controlling the flow of water from the source to the cell for electrolyte replenishment, said valve assembly comprising:
   a housing being sealingly engageable with an opening in said cell;
   a water inlet positioned in said housing, said inlet being connectable to said water source for receiving water therefrom;
   a valve mounted within said housing in fluid communication with said water inlet, said valve having a member movable to open said valve and admit water from said source into said cell, said member also being movable to close said valve and halt the flow of water to said cell; and
   a flash arrester positioned within said housing between said water inlet and said valve such that water and gases flowing between said inlet and said valve flow through said flash arrestor, said flash arrester having a plurality of passageways therethrough adapted to allow water to flow from said water inlet to said valve through said flash arrestor when said valve is open, said passageways being sized so as to prevent a flame from passing therethrough.

2. A valve assembly according to claim 1, wherein said flash arrester comprises a porous medium.

3. A valve assembly according to claim 1, wherein said flash arrester comprises:
   (1) a chamber having a central space defined by a sidewall surrounding said space, said chamber having a first end in fluid communication with said inlet and a second end in fluid communication with said valve; and (2) a body positioned within said chamber, said body having an outer surface interfacing with said sidewall, a plurality of grooves being positioned in said outer surface and extending along said body, each of said grooves facing said sidewall and extending longitudinally along the entire length of said outer surface, said grooves cooperating with said sidewall so as to form said passageways allowing water to flow from said inlet to said valve, said grooves being sized so as to quench a flame within said chamber.

4. A valve assembly according to claim 1, wherein said flash arrester comprises:
   (1) a chamber having a central space defined by a sidewall surrounding said space, said chamber having a first end in fluid communication with said inlet and a second end in fluid communication with said valve, a plurality of grooves extending lengthwise along said sidewall facing said central space; and (2) a body positioned within said chamber, said body having an outer surface interfacing with said sidewall, said grooves cooperating with said outer surface of said body so as to form said passageways allowing water to flow from said inlet to said valve, said grooves being sized so as to quench a flame within said chamber.

5. A valve assembly for controlling the flow of water from a water source to a battery cell for use in replenishing the cell with water, said valve assembly comprising:
   a housing having a section that is insertable within an opening in said cell;
   an inlet connectable to said water source to receive water therefrom;
   a valve in fluid communication with said inlet, said valve having a member which is moveable to control the flow of water to said cell; and
   a flash arrester positioned to be in fluid communication with said inlet such that water and gases flowing between said inlet and said battery cell pass through said flash arrester, said flash arrester having passageways there through sized so as to allow water to flow there through but which prevent a flame from passing there through.

6. A valve assembly according to claim 5 wherein the flash arrester comprises polypropylene.

7. A valve assembly according to claim 5 wherein the flash arrester comprises a sintered plastic.

8. A valve assembly according to claim 5 wherein the flash arrester comprises a ceramic material.

9. A valve assembly according to claim 5 further comprising:
   a vent duct positioned within said housing and providing fluid communication between said cell and the ambient; and
   a second flash arrester in fluid communication with said vent duct and positioned such that gases venting from said cell through said vent duct to said ambient pass through said second flash arrester.

10. A valve assembly according to claim 9, further comprising an elongated conduit in fluid communication with said vent duct, said conduit extending away from said cell for releasing said gases to the ambient remotely from said cell.

11. A valve assembly according to claim 5 wherein said valve assembly comprises a float buoyantly supportable by an electrolyte within said cell so as to move in response to changes in the level of said electrolyte, said float being operatively connected to said valve so as to open and close said valve in response to changes in the level of the electrolyte.

12. A valve assembly according to claim 11 further comprising an indicator movably positioned within said housing, said indicator being attached to said float so as to move in response to motion of said float, whereby the position of said indicator is indicative of the level of the electrolyte in said cell.

13. A valve assembly according to claim 11 further comprising:
- first and second elongated arms arranged in substantially parallel, spaced apart relation within said housing, one end of each arm being pivotally attached to said housing, the other end being pivotally attached to said float to form a four bar mechanism, said float pivoting said arms upon movement relatively to said valve; and
- a link member connecting one of said arms to said movable valve member, said link member moving said valve member upon pivoting of said one arm to open said valve and admit water to said cell when said float moves in a direction away from said valve indicative of a low electrolyte level, said link member moving said valve member to close said valve and halt water flow to said cell when said float moves toward said valve to a position indicative of an adequate electrolyte level within said cell.

14. A valve assembly according to claim 5, wherein said housing includes a lower portion having a flexible, resilient outwardly bulged section for mounting said valve assembly within said opening.

15. A valve assembly according to claim 5, wherein said housing includes a lower portion having an O-ring extending circumferentially there around, said O-ring being sealingly engageable with said opening for mounting said valve assembly within said opening.

16. A battery having a plurality of cells which can be replenished with water from a common water source, said battery comprising:
- a common water conduit for providing replenishment water to said cells; and
- valve assemblies for controlling the flow of replenishment water to the cells, each of said valve assemblies being in accordance with the valve assembly of claim 5.

17. A battery according to claim 16 wherein each said valve assembly further comprises:
- a vent duct positioned within said housing for providing fluid communication between said cell and the ambient for venting gases from said cell; and
- a flash arrester in fluid communication with said vent duct, said flash arrester comprising a porous medium having pores sized to prevent a flash front from passing there through.

18. A battery float valve assembly for use in controlling the flow of replenishment water from a water source to a battery cell having a liquid electrolyte within, said battery float valve assembly comprising:
- a housing having a section that is insertable within an opening in said battery cell;
- an inlet connectable to said water source to receive water therefrom;
- a valve in fluid communication with said inlet for controlling the flow of water to said battery cell;
- a float mounted to said valve assembly and positioned to be buoyantly supported by said electrolyte within said battery cell so as to move in response to movement of the level of said electrolyte, said float being operatively linked to said valve such that said valve controls the flow of water to said battery cell in response to movement of said float, and
- a flash arrestor positioned within the housing to be in fluid communication with said inlet such that water and gasses flowing between said inlet and said battery cell pass through said flash arrestor, said flash arrestor having a plurality of passageways through which water can flow but which prevents a flame from passing there through.

19. A battery float valve assembly in accordance with claim 18 wherein said flash arrestor comprises a porous medium.

20. A battery water valve assembly mountable on a battery cell and connectable to a water source for controlling the flow of water from the source to the cell for electrolyte replenishment, said valve assembly comprising:
- a housing having a section sized to be insertable into an opening in said cell;
- a water inlet connectable to said water source for receiving water therefrom;
- a water outlet within said housing and in communication with said inlet, said water from said inlet passing through said outlet into said cell for electrolyte replenishment;
- a water conduit connecting said inlet to said outlet;
- a valve mounted within said water conduit in fluid communication with said water inlet, said valve having a member movable to open said valve and admit water from said source into said cell, said member also being movable to close said valve and halt the flow of water to said cell; and
- a flash arrester positioned within said internal water conduit such that the water flowing from said water source through said inlet to said valve flow through said flash arrestor and any gasses that flow through said internal water conduit would also flow through said flash arrestor, said flash arrester having a plurality of passageways therethrough adapted to allow water to flow through said flash arrestor, and which passageways are sized so as to prevent a flame from passing therethrough.

* * * * *